UNITED STATES PATENT OFFICE.

CAROLINE LEARNED, OF COLUMBUS, OHIO.

IMPROVED NITRATED MERCURIAL OINTMENT.

Specification forming part of Letters Patent No. 37,697, dated February 17, 1863.

*To all whom it may concern:*

Be it known that I, CAROLINE LEARNED, of Columbus, in the county of Franklin and State of Ohio, have invented a new and useful Vermin-Ointment; and I do hereby declare that the following is a full and complete description of the ingredients used, their proportions, and the manner of compounding the same.

The ingredients used are quicksilver, nitric acid, lard, beeswax, alkanet-root, and oil of sassafras.

I first take one ounce of quicksilver and of good nitric acid two ounces, and place the two ingredients in a glass or earthern vessel and let them remain till the quicksilver is dissolved. I now take one pound of lard and two drams of pulverized alkanet-root, and one dram of beeswax. The beeswax, alkanet-root, and one-fourth part of the lard are put into a suitable vessel and melted. The root yields its color and properties to the lard and wax. I then strain out the sediment. The remainder of the lard is now warmed till it assumes a liquid form, and is then added to that which has been colored, and thoroughly mixed, and while this mixture of beeswax, lard, and alkanet-root is still in a semi-fluid state I pour it into the vessel containing nitrate of mercury (quicksilver and nitric acid) and thoroughly mix with a wooden spatula, and while thus stiring I add and thoroughly incorporate one ounce of oil of sassafras. As soon as the mass has cooled to a proper consistency I pack it in wooden or paper boxes containing half an ounce or more, as desired.

In using this ointment it is only necessary to rub a small quantity along the seams of garments or other places infected with vermin and they are quickly destroyed.

This ointment may be used for certain kinds of cutaneous eruptions, but its principal design is the destruction of insect vermin, which become so exceedingly annoying to soldiers while in the field or in camp-life.

What I claim as my invention, and desire to secure by Letters Patent, is—

The herein-described vermin-ointment, composed of the ingredients named and compounded in the manner specified.

CAROLINE LEARNED.

Witnesses:
EUNICE LEARNED,
JNO. J. MILLER.